Aug. 11, 1953
G. I. GOODWIN ET AL
2,648,371
METHOD AND MACHINE FOR PRODUCING
A CONTINUOUS HONEYCOMB STRUCTURE
Filed March 27, 1948
11 Sheets-Sheet 1
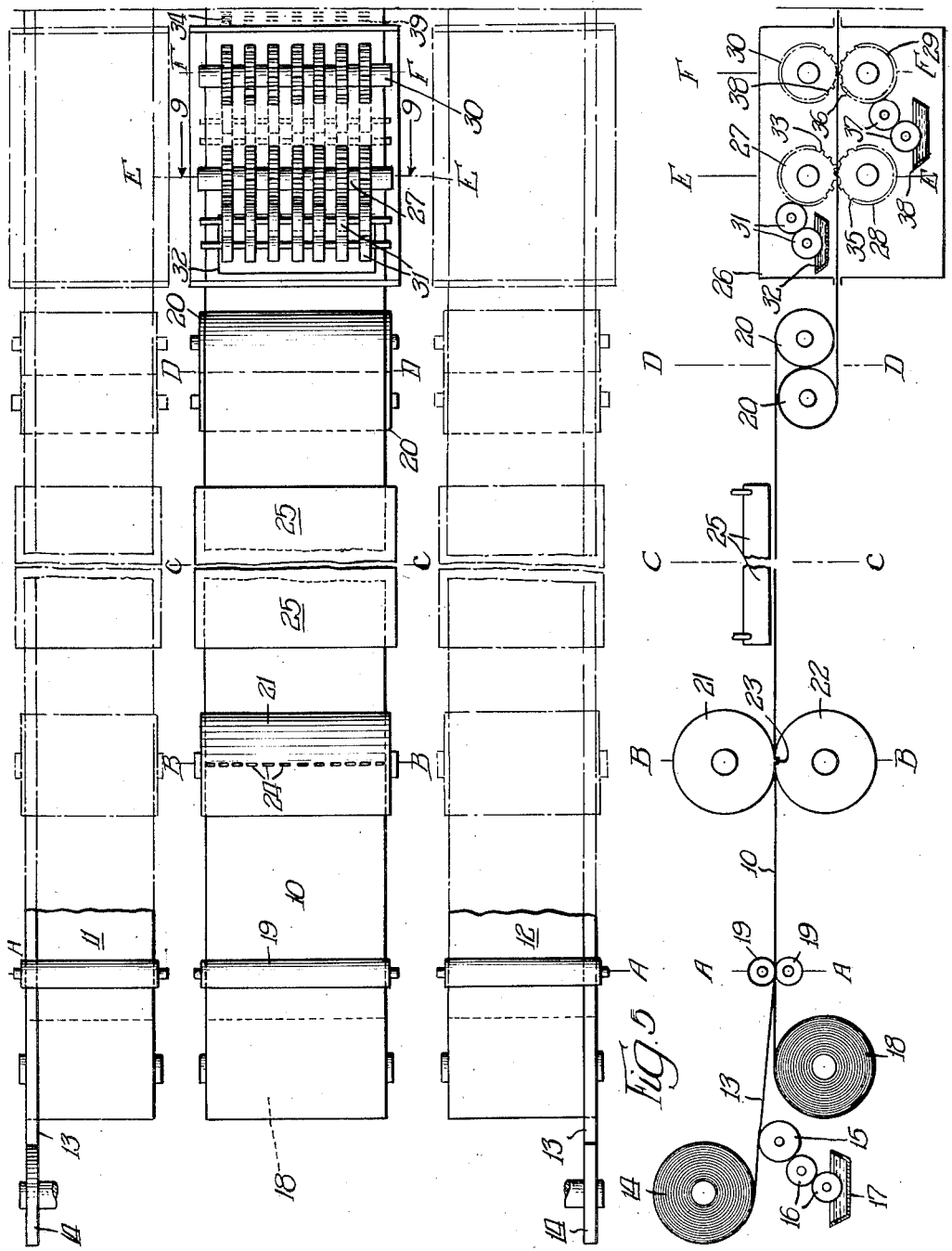
INVENTORS
George I. Goodwin,
BY Howard H. Klee,
Cromwell, Greist & Warden
Attys.

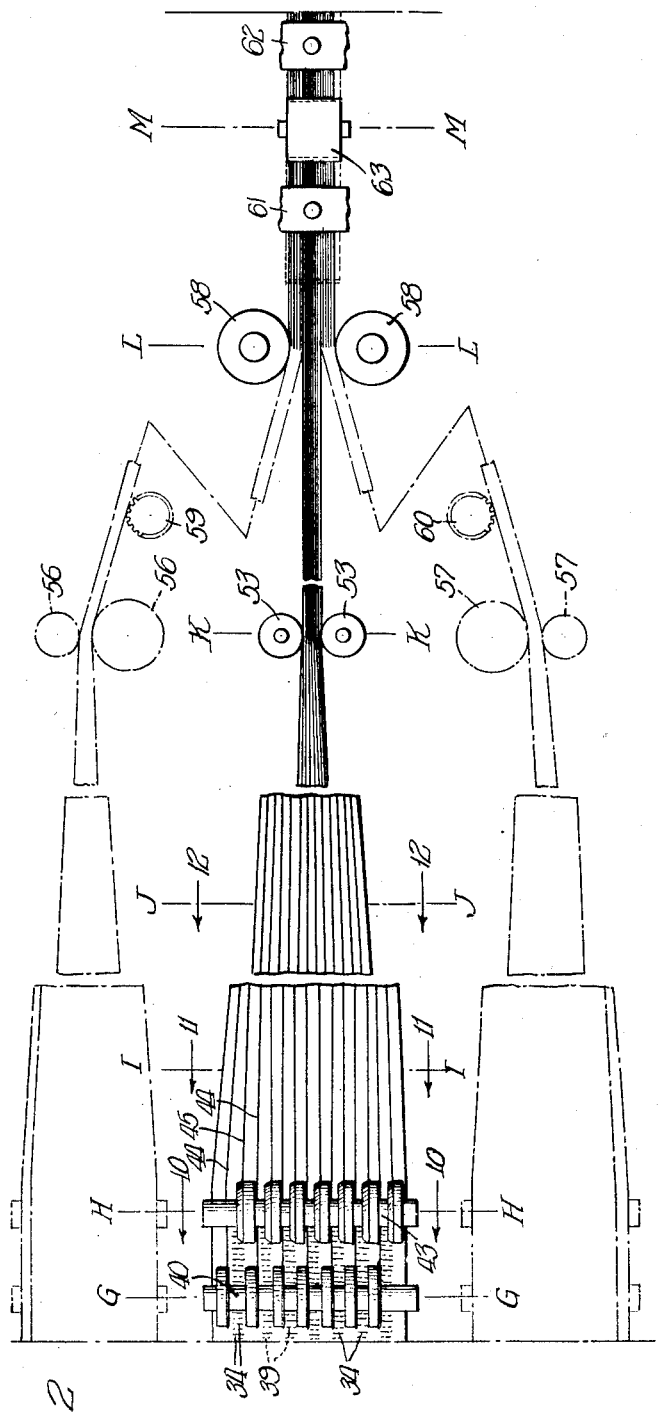

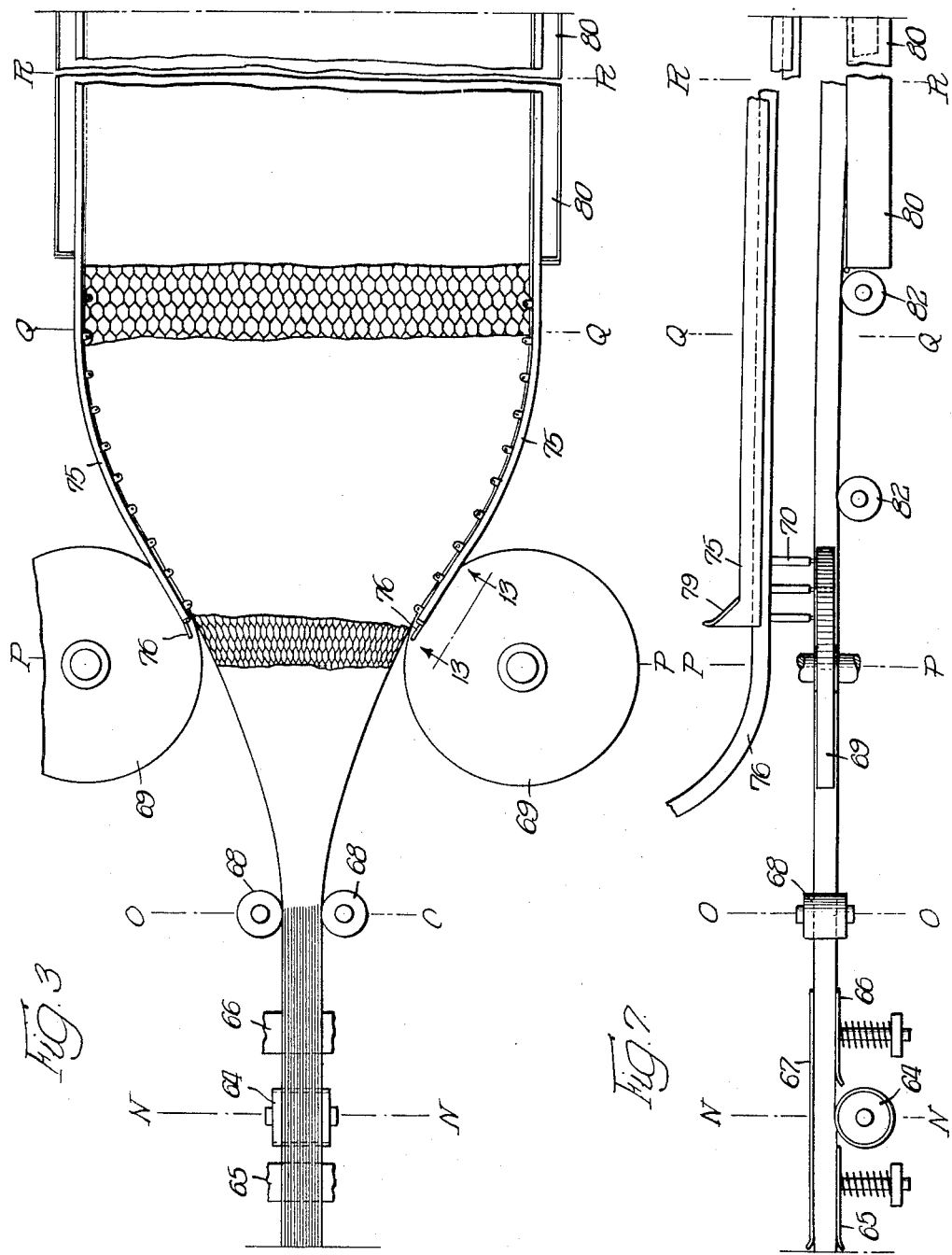

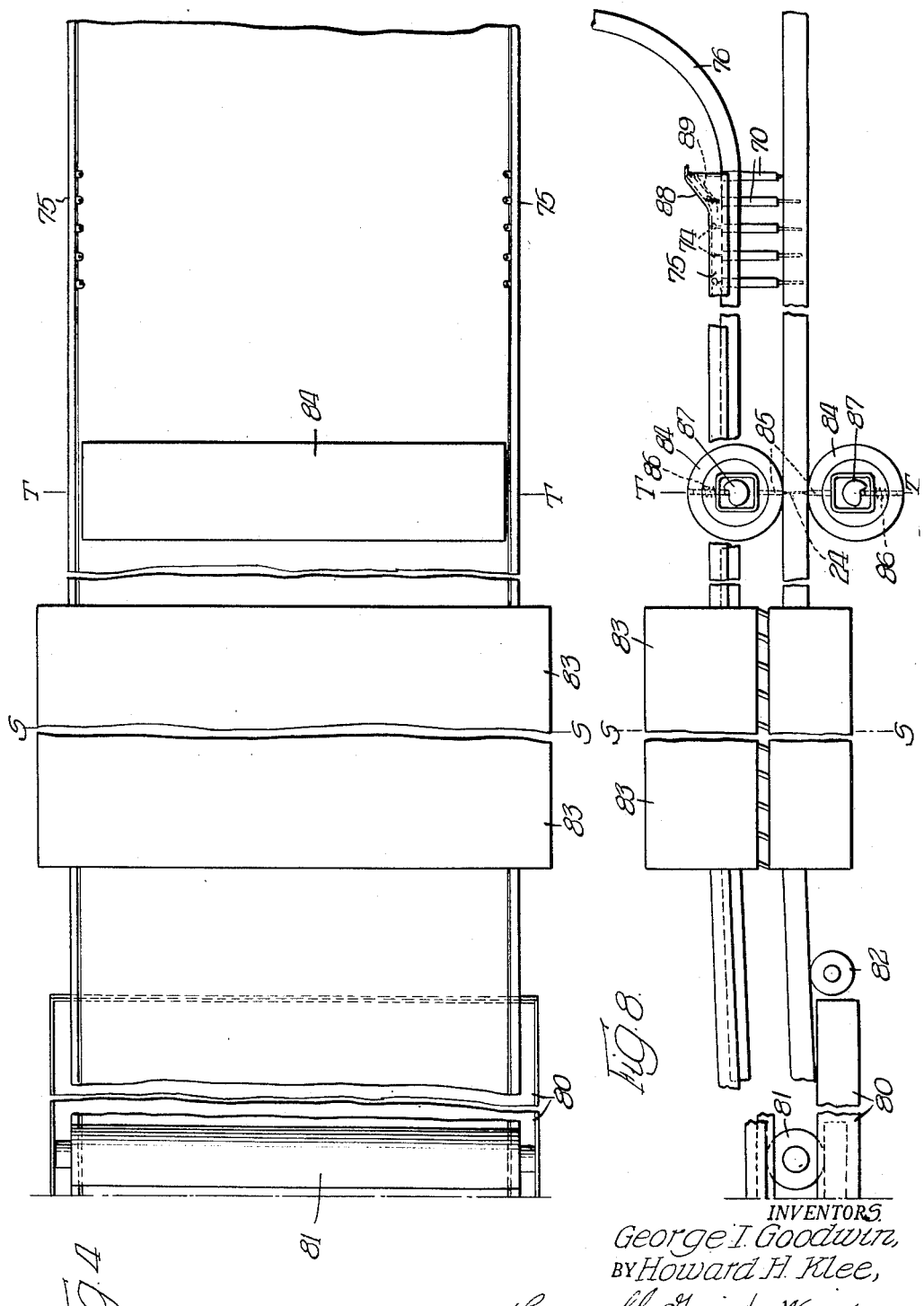

Aug. 11, 1953     G. I. GOODWIN ET AL     2,648,371
METHOD AND MACHINE FOR PRODUCING
A CONTINUOUS HONEYCOMB STRUCTURE
Filed March 27, 1948                     11 Sheets-Sheet 5
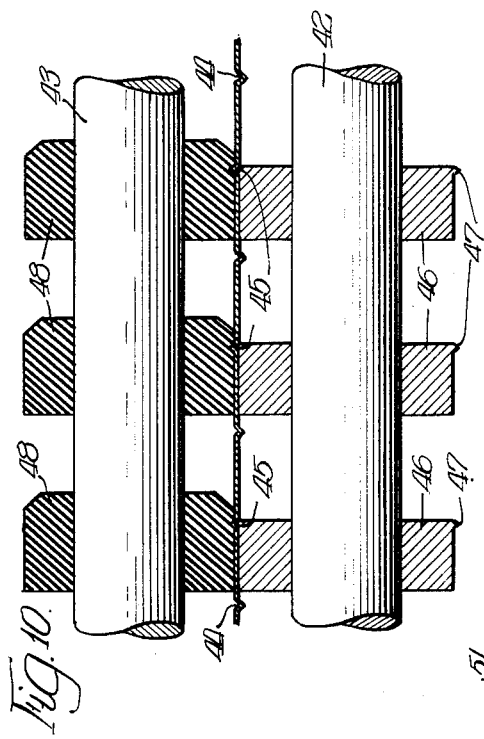
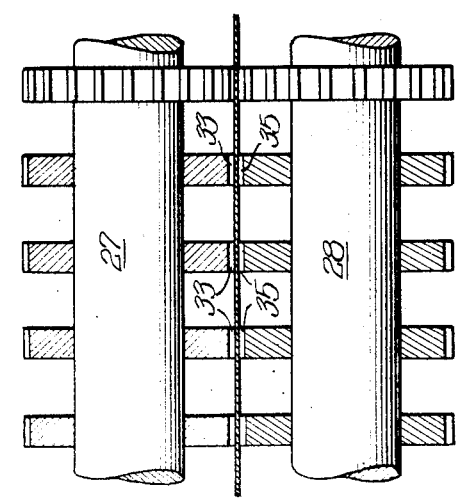
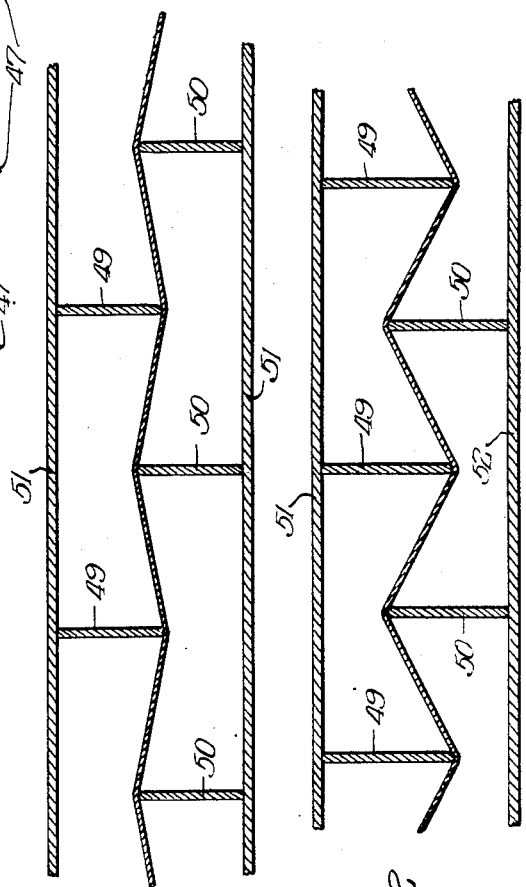
INVENTORS.
George I. Goodwin.
BY Howard H. Klee,
Cromwell, Greist & Warden
ATTYS.

Aug. 11, 1953    G. I. GOODWIN ET AL    2,648,371
METHOD AND MACHINE FOR PRODUCING
A CONTINUOUS HONEYCOMB STRUCTURE
Filed March 27, 1948    11 Sheets-Sheet 6
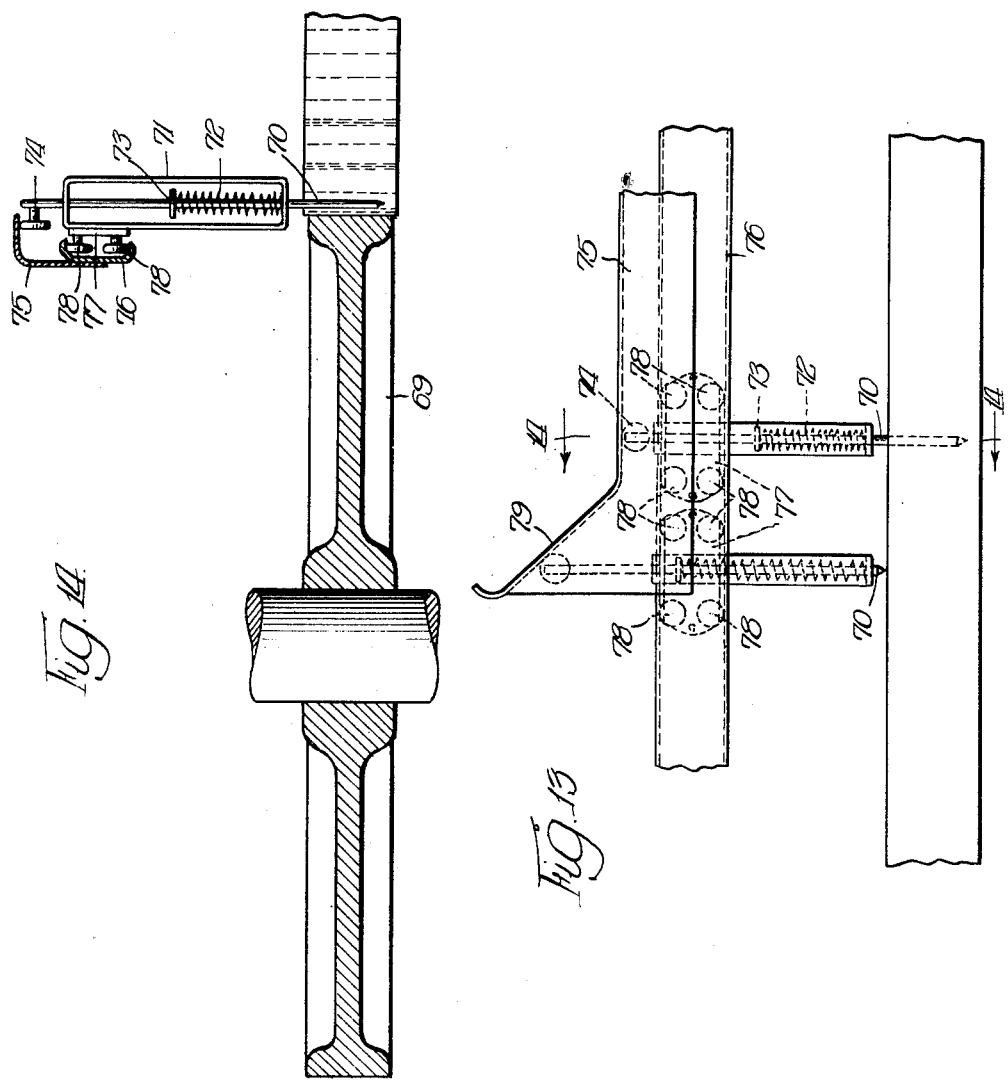
INVENTORS.
George I. Goodwin,
BY Howard H. Klee,
Cromwell, Greist + Warden

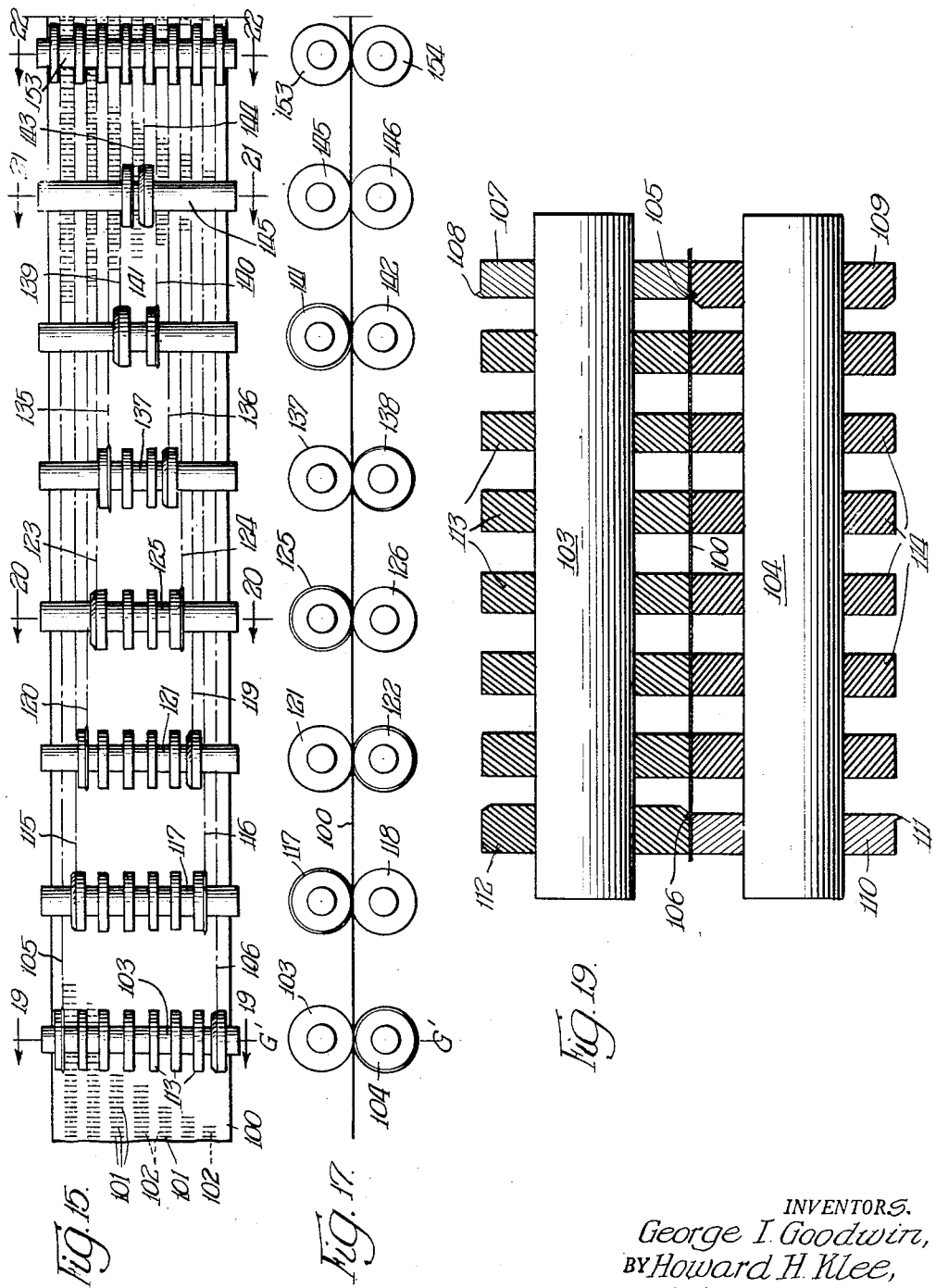

Aug. 11, 1953 G. I. GOODWIN ET AL 2,648,371
METHOD AND MACHINE FOR PRODUCING
A CONTINUOUS HONEYCOMB STRUCTURE
Filed March 27, 1948 11 Sheets-Sheet 8
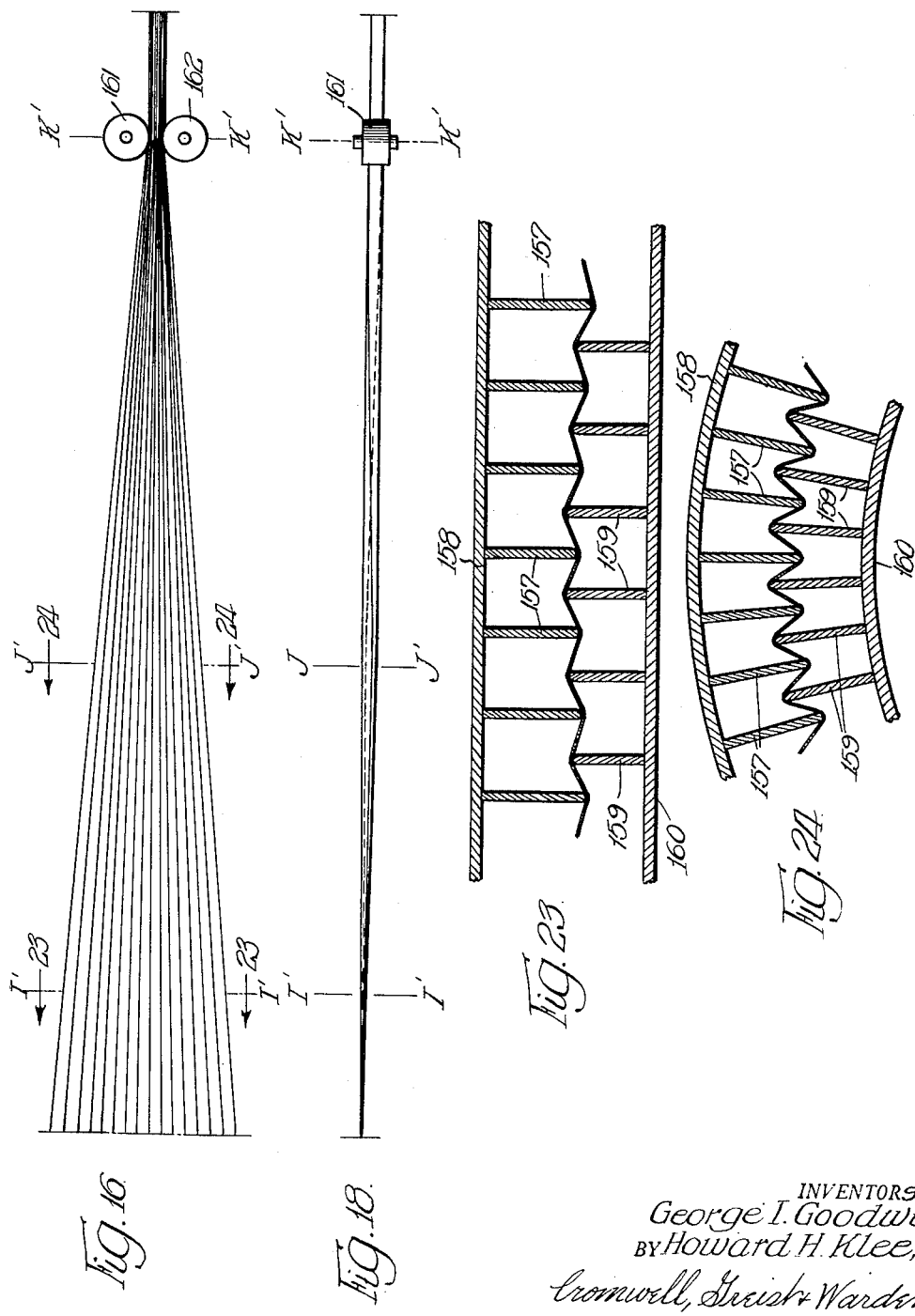
INVENTORS
George I. Goodwin,
BY Howard H. Klee,
Cromwell, Greist & Warden
ATTYS.

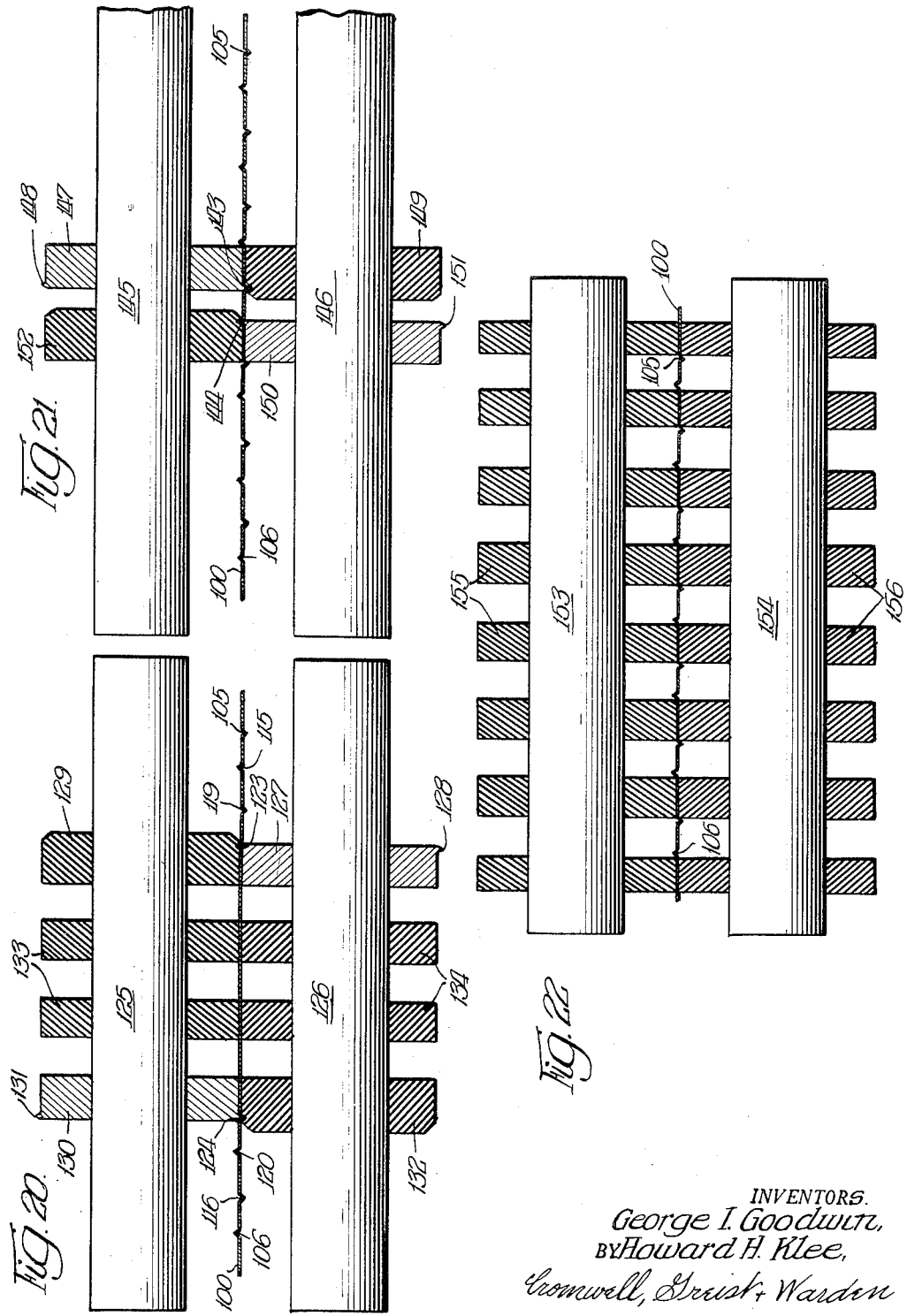

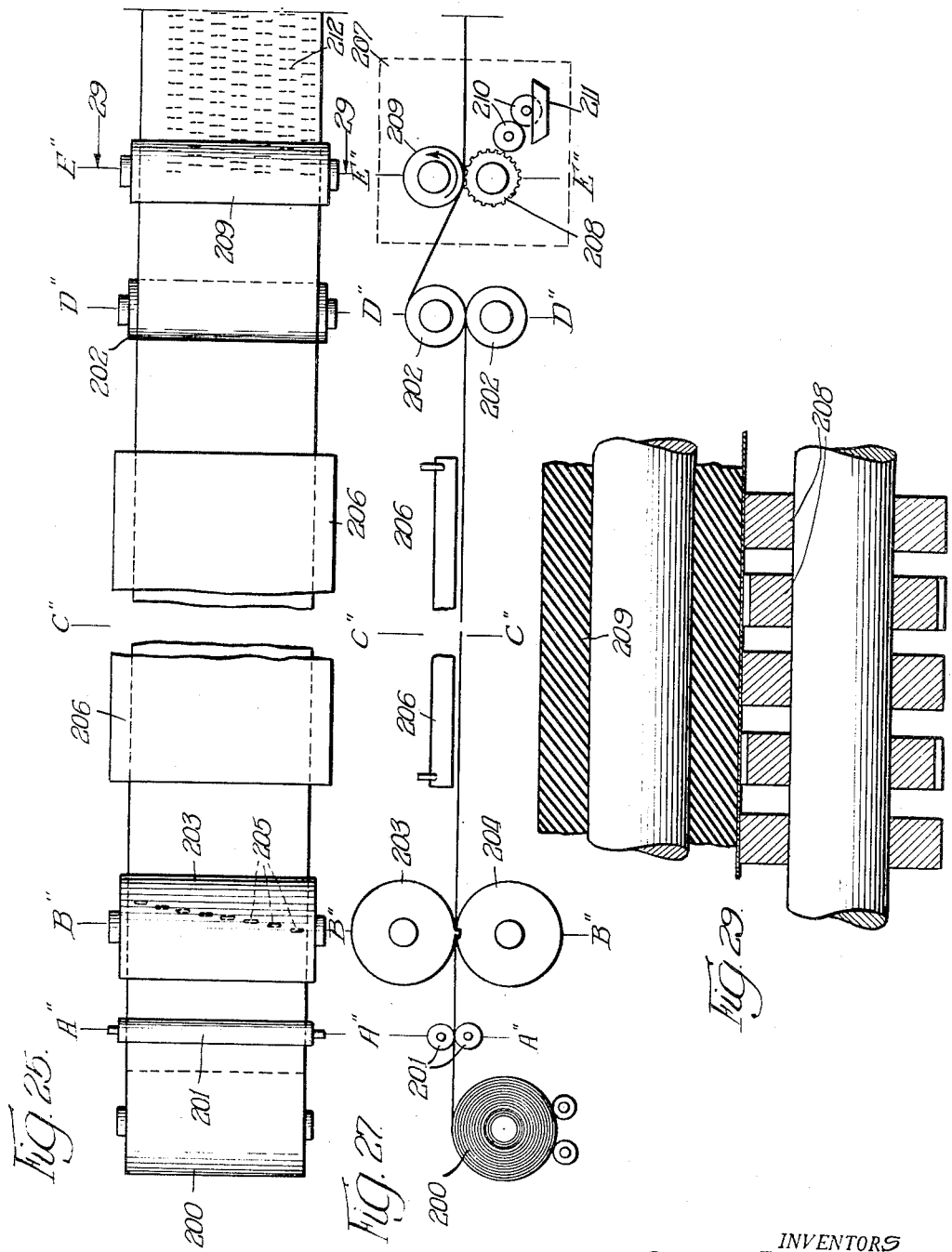

Aug. 11, 1953
G. I. GOODWIN ET AL
2,648,371
METHOD AND MACHINE FOR PRODUCING
A CONTINUOUS HONEYCOMB STRUCTURE
Filed March 27, 1948
11 Sheets-Sheet 11
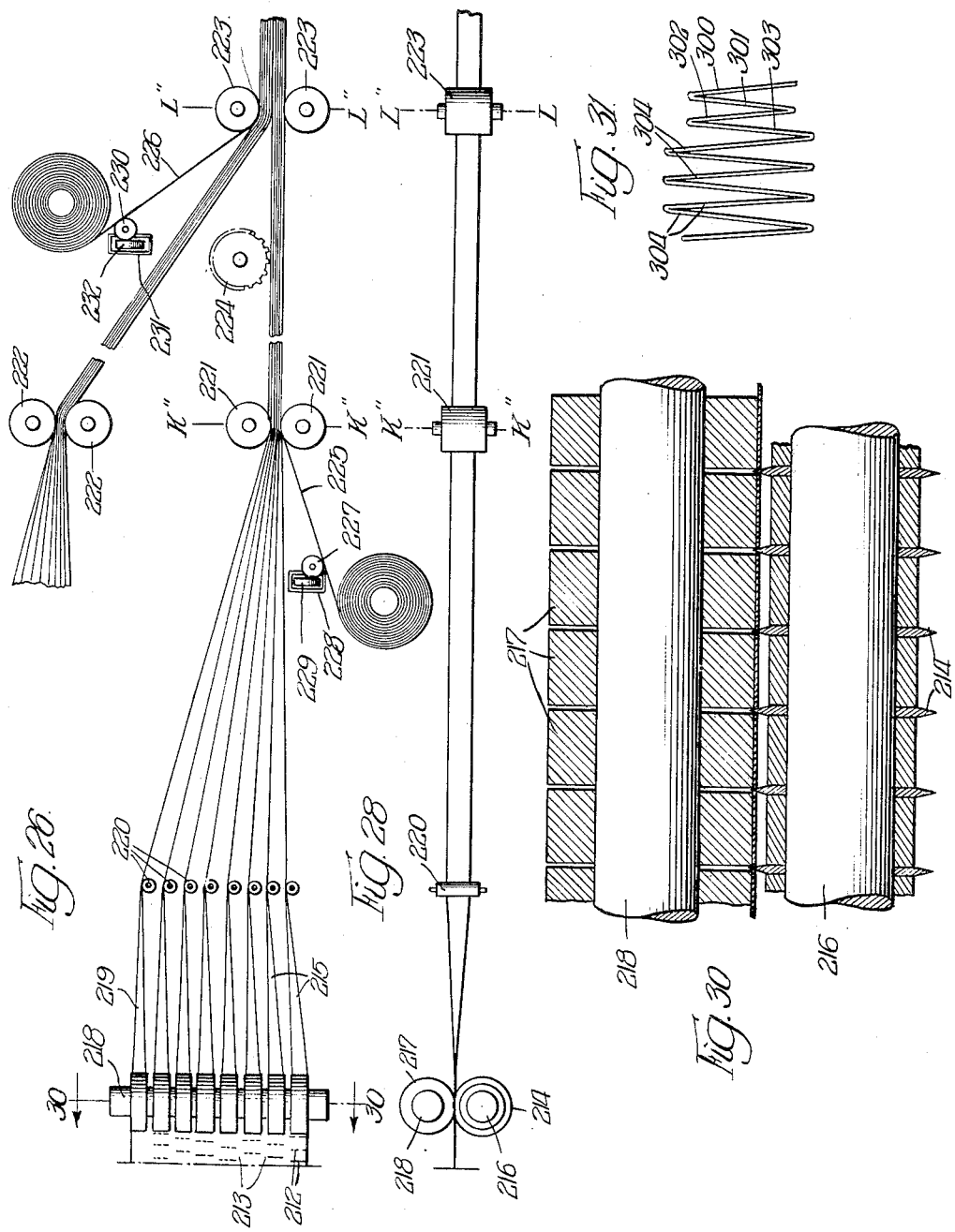
INVENTORS
George I. Goodwin,
BY Howard H. Klee,
Cromwell, Greist + Warden Patented Aug. 11, 1953

2,648,371

UNITED STATES PATENT OFFICE 2,648,371

METHOD AND MACHINE FOR PRODUCING A CONTINUOUS HONEYCOMB STRUCTURE

George I. Goodwin, Birmingham, and Howard H. Klee, Royal Oak, Mich.; said Klee assignor to said Goodwin Application March 27, 1948, Serial No. 17,424

26 Claims. (Cl. 154—1.8)

This invention relates to a new and improved method and machine for automatically producing from one or more strips or webs of flexible paper-like material a relatively thick rigid honeycomb core structure in continuous ribbon-like form.

It is a general object of the invention to provide a method and machine for progressively fabricating one or more strips or webs of relatively thin sheet-like material into a relatively thick rigid cellular core structure which core structure may be used for many purposes, as for example, the interior frame work of building panels, doors, table tops, etc.

It is a specific object of the invention to provide a method and machine for fabricating from a paper-like material a relatively rigid cellular core structure wherein a continuously moving web of the material is divided along parallel lines into a large number of relatively narrow longitudinally extending strips, each of the strips is progressively turned through an angle of approximately 90°, the strips are compacted and connected at longitudinally spaced points with lines of adhesive, the points of connection being staggered at opposite sides of each strip, thereafter the connected strips are progressively separated or expanded into a cellular structure of the desired width, the expanded structure is impregnated with rigidifying material and the rigidifying material is set while the structure is in its expanded condition.

It is another object of the invention to provide a machine and method of the type described wherein the adhesive lines connecting the strips are applied transversely of the web in longitudinally spaced relation and staggered on opposite faces of the web prior to the formation of the web into the narrow longitudinally extending strips.

Another object of the invention is to provide a method and machine for the purpose described wherein the web of material is divided into the narrow longitudinally extending strips by longitudinally extending transversely spaced crease lines which are applied in alternately spaced relation on opposite faces of the material and wherein the material is subsequently folded to bring the longitudinal strips into alternate face-to-face relation.

A further object of the invention is to provide a method and machine of the type described wherein the web is divided into the longitudinally extending strips by longitudinally extending crease lines which are applied in alternately spaced transverse relation on opposite faces of the web, and wherein the crease lines are applied by crease rolls arranged in longitudinally spaced and staggered relation to thereby apply, first the outer crease line, and thereafter the inner crease lines in progressively staggered relation.

A still further object of the invention is to provide a method and machine of the type described wherein the web is divided into a series of relatively narrow longitudinally extending individual strips by a slitting operation, the slitting being accomplished preferably by slitting knives which are arranged in longitudinally spaced and staggered relation, with the outer knives being operative on the web first, and the inner knives being operative thereafter in progressively inward relation.

Another object of the invention is to provide a method and machine for the purpose described wherein the adhesive or glue lines for connecting the strips when the strips are gathered into face-to-face relation are applied to the web of material in longitudinally extending laterally spaced rows and the individual lines in each row are longitudinally spaced in staggered relation to the lines in adjacent rows to thereby obtain proper transverse registry when the material is divided into individual strips and the strips are compacted in such a manner that the strips formed from the marginal portion at one side of the web of material traverse a longer path than the strips formed from the other portion of the web.

Another object of the invention is to provide in a method and machine of the type described positioning guides for controlling the longitudinally extending strip portions while they are being gathered or compacted into face-to-face relation, the positioning guides extending longitudinally of the path of travel of the material and preferably being arranged on a transversely curved support to provide a path of travel for the center portion of the gathered material, which path will be longer than would occur should the gathered material be allowed to move straight across and not be forced to travel over the transversely curved support, thereby compensating for the difference in distance which the center and outer portions of the material would have to travel had the curved support not been provided.

Another object of the invention is to provide a method and machine for the purpose described wherein the top and bottom surface of the material is subjected to a trimming operation after the longitudinal strips have been compacted in edgewise relation and connected in face-to-face relation by the longitudinally spaced transverse lines of adhesive to thereby disconnect the strips at their edges and permit the material to be expanded into a relatively wide honeycomb core structure.

Another object of the invention is to provide a method and machine of the type described wherein the compacted and connected strips are expanded into a relatively wide cellular structure by means of two sets of needle-like elements arranged to travel in laterally spaced endless paths, which needle-like elements successively engage in the cells adjacent the outer longitudinal margins of the expanding structure and move, first, in outwardly divergent paths, and thereafter, in laterally spaced parallel paths to positively control the expansion of the structure and maintain the same in an expanded ribbon-like form of uniform width during the application and setting of the rigidifying material.

A still further object of the invention is to provide a method and machine of the type described wherein the compacted and connected strips are expanded by a pair of edge engaging mechanisms, which mechanisms comprise guide wheels for engaging the outer faces of opposite side edges of the material at an intermediate point in the expansion of the same, and cooperating expanding elements mounted for movement in laterally spaced endless paths along the side edges of the material for engaging the material inwardly of the side edges thereof to positively control the expanding of the material.

Another object of the invention is to provide a method and machine for the purpose described wherein the outer edges of the material are reinforced so that when the material is compacted into the longitudinally extending connected strip formation the outer edge strips will have sufficient thickness or strength to withstand tearing stresses when engaged by the expanding mechanism.

Another object of the invention is to provide a method and machine of the type described wherein the outer edge strip portions are formed somewhat narrower than the intermediate strip portions so that when the top and bottom surfaces of the compacted and connected strip portions are trimmed a predetermined number of the outer edge strip portions will not be trimmed and will remain in their folded edge connected relation to provide outer reinforced edges of sufficient strength to prevent tearing of the same by the expanding mechanism.

It is a further object of the invention to provide a method and machine for the purpose described wherein the web of material is initially provided with longitudinally spaced transversely extending lines of relatively short slots which slots are somewhat less in length than the ultimate thickness of the final honeycomb structure and which are so arranged that when the honeycomb structure is formed a slot will extend intermediate the top and bottom edge of each strip and the slots in adjacent strips will be in registry transversely of the structure and wherein the final core structure is severed, at the end of the rigidifying operation, transversely along the line of slots to provide predetermined lengths of the same.

While the foregoing statements are indicative in a general way of the nature of the invention, other more specific objects and advantages will be apparent to those skilled in the art upon a full understanding of the new method and machine.

One embodiment of the invention and certain modifications thereof are presented herein for the purpose of illustration, but it will be appreciated that the illustrated methods and machines are susceptible of further modification within the spirit and teaching of this disclosure without departing from the invention as defined in the appended claims.

In the accompanying drawings:

Figs. 1, 2, 3 and 4 schematically illustrate in plan a machine constructed in accordance with the invention for practicing the method of the invention;

Figs. 5, 6, 7 and 8 together illustrate in side elevation the machine shown in Figs. 1 to 4.

Figs. 9 to 12 are partial sections, to an enlarged scale, taken on the lines 9—9, 10—10, 11—11 and 12—12, respectively, of Figs. 1 and 2;

Fig. 13 is a fragmentary elevation, taken generally on the lines indicated at 13—13 of Fig. 3;

Fig. 14 is a section taken on the line 14—14 of Fig. 13;

Figs. 15 and 16 together illustrate a modified form of certain portions of the machine;

Figs. 17 and 18 together illustrate in side elevation the modification shown in Figs. 15 and 16;

Figs. 19 to 24 are partial sections, to an enlarged scale, taken on lines 19—19, 20—20, 21—21, 22—22, 23—23 and 24—24, respectively, of Figs. 15 and 16;

Figs. 25 and 26 together illustrate a further modification of portions of the machine;

Figs. 27 and 28 together illustrate in side elevation the modification shown in Figs. 25 and 26;

Figs. 29 and 30 are partial sections, to an enlarged scale, taken on lines 29—29 and 30—30 of Figs. 25 and 26; and Fig. 31 illustrates a modification in the method of providing reinforced side edges on the honeycomb structure.

The machine and method of the present invention have to do in a general way with the subject matter of the copending application of John D. Lincoln and George M. Thomson Serial No. 272, filed January 2, 1948, Patent No. 2,553,054, for Machine and Method for Producing a Continuous Honeycomb Structure, which involves the fabrication of a similar core structure.

Referring to Figs. 1 to 8 of the drawings, there is illustrated somewhat schematically, a machine embodying the principles of the invention, and by means of which the steps constituting the method of the invention may be conveniently carried out. For convenience in illustration and to assist in fully understanding the invention, the stations at which the various operations are performed are indicated by the lettered lines A, B, C, etc. in the order of the sequence of operations.

The illustrated machine is adapted to fabricate a cellular core structure of predetermined width from one or more webs of paper or other suitable material. In order to use rolls of stock material which are of standard widths provision is made for supporting and guiding a plurality of webs of material in laterally spaced parallel paths and for performing certain preliminary operations, including the application of adhesive lines and crease lines, by separate mechanisms arranged along the path of travel of the separate webs. A central web 10 and laterally spaced supplementary webs 11 and 12 of different widths are shown, by way of example, in Figs. 1 and 2. The mechanisms for performing the preliminary operations on the web 10 are shown in solid lines. Corresponding mechanisms for performing the same operations are indicated in dotted line along the path of webs 11 and 12. The same operations are performed on all the webs at stations A to K and the webs are brought together at station L (Figs. 2 and 6). The combined material is illustrated in solid line between station L and the discharge end of the machine. If the desired width of core can be fabricated from a single roll of material of standard width then only one web 10 will be used.

It is desirable to provide a reinforced outer edge for the core structure and this may be accomplished by applying to each of the outer edges of the web material a reinforcing strip of suitable material and of a width approximately the same as the depth of the ultimate core structure. As illustrated in Figs. 1 and 5, edge reinforcing strips 13 are supplied from rolls 14 which are located relative to the web supply rolls so that the strips 13 are fed in superimposed relation along the outer margin of the webs 11 and 12.

An adhesive is applied to the bottom surface of each of the reinforcing strips 13 by a coating roll 15 which is supplied with the adhesive by feed rollers 16 and supply fountain 17. The adhesive coated bottom surfaces of the edge reinforcing strips 13 are engaged with the upper surfaces of the respective webs to secure the strips in position.

Since the preliminary operations on all the webs are the same, the mechanisms for carrying out these operations will be described with reference to web 10 only, it being understood that the mechanisms (indicated in dotted line in Fig. 1) for performing the corresponding operations on side webs 11 and 12, or any other webs which may be provided for obtaining a core structure of the desired width, are the same.

The web 10 is fed from the supply roll 18 and moves between a pair of cooperating feed rollers 19 (station A) where it is supplied with edge reinforcing strips when the machine is operating with a single web. The web 10 is maintained under tension by suitably driven tension applying rollers 20 (station D) which are spaced some distance from the feed rollers 19. Between the feed rollers 19 and the tensoin applying rollers 20 the web 10 is subjected to the operation of a flying punch mechanism (station B) consisting of a slotting roll 21 and a cooperating platen roll 22.

The slotting roll 21 is provided on its surface with a line of transversely extending spaced punch members or cutters 23 each of a length somewhat less than the desired thickness of the core structure. The cutters 23 are arranged to provide a series of spaced slots or perforations 24 across the width of the web 10. The transverse spaces between the respective slots 24 are such that when the web is folded into a series of longitudinally extending strip portions and formed into the ultimate core structure the slots 24 extend intermediate the folded edges of the strip portions and are in substantial alignment or registry across the core structure. The rolls 21 and 22 are constructed and operated to provide transverse lines of the slots 24 at predetermined intervals longitudinally of the web. The finished core structure is cut into lengths along the lines of slots 24 by a cutting mechanism positioned at the discharge end of the machine, the structure and operation of which will be described.

The paper web 10 is subjected to a moisture equalizing mechanism 25 (station C) which may consist of a hot plate or similar member and which is located preferably between the slotting roll 21 and the tension applying rollers 20, the paper being held taut while subject to the moisture equalizing treatment. The paper roll or rolls 18 may be pre-conditioned, of course, by a preliminary drying operation to remove excess moisture before being placed in the machine.

The web of material 10 passes from the tension applying rollers 20 into a heated chamber or zone 26 which houses mechanism for applying lines of suitable adhesive on the top and bottom surfaces of the web. The mechanism comprises a pair of rolls 27, 28 for applying lines of adhesive to the upper surface of the web of material and a pair of rolls 29, 30 for applying lines of adhesive to the lower face of the web.

The roll 27 receives adhesive from the feed rollers 31 and supply fountain 32 and is provided with spaced radial projections 33 on its peripheral surface for applying a plurality of longitudinally spaced transversely extending lines of adhesive on the upper surface of the web, the transversely extending projections 33 being interrupted so that each transverse adhesive line consists of a series of relatively short lines 34 of the adhesive arranged in spaced relation across the width of the web. The lines 34 are of a length approximately the same as the depth of the ultimate core structure. The projections 33 are uniformly spaced around the circumference of the roll 27 to provide spaces of predetermined length, in a direction longitudinally of the web, between the adhesive lines 34.

The roll 28 provides platen surfaces 35 cooperating with the adhesive applicator roll 27. The rolls 29 and 30 are arranged in longitudinally spaced relation to the rolls 27 and 28 and roll 29 is provided with radial projections 36 which extend transversely of the roll and are of the same character as the projections 33 on the roll 27. The roll 29 is supplied with adhesive by feed rollers 37 and supply fountain 38. The roll 30 is supplied with platen surfaces 38 for cooperating with projections 36 on the roll 29 in applying adhesive lines 39 to the lower face of the web. The two pairs of rolls 27, 28 and 29, 30 are arranged longitudinally of the web of material so that the adhesive lines 39 which are applied by the roll 29 are in alternate longitudinally spaced relation to the adhesive lines 34 which are applied by the roll 27. As the web emerges from the chamber 26 it is supplied on its top and bottom surfaces with continuous longitudinal rows of short adhesive lines 34 and 39, the rows being separated transversely of the web by spaces, and the lines in corresponding rows on opposite surfaces of the web being arranged in alternate longitudinally spaced relation.

The web passes from the glue applying chamber 26 to longitudinally spaced pairs of crease forming members 40, 41 and 42, 43 which apply a plurality of longitudinally extending crease lines 44 and 45 in alternate laterally spaced relation on opposite surfaces of the web of material. Since the pairs of crease forming members 40, 41 and 42, 43 are identical, only members 42 and 43 which apply the crease lines 45 on the lower face of the web of material, will be described in detail.

Referring to Fig. 10, crease forming member 42 comprises a plurality of axially or transversely spaced roll sections 46 each of which is provided with a circumferential creasing rule 47. Member 43 is provided with a plurality of transversely spaced roll sections 48 for cooperating with the opposed creasing rules 47 in providing the crease lines 45 on the web of material. The roll sections 48 are illustrated as formed of resilient material, such as rubber, but they may be formed of steel or any other suitable material. The crease lines 45 are arranged in alternate laterally spaced relation to the crease lines 44 on the top surface of the web. The space between adjacent crease lines 44 and 45 is somewhat greater than the depth or thickness of the desired core structure to allow for a trimming operation which will be described.

The crease lines 44 and 45 divide the web of material into a series of longitudinally extending strip portions of substantially equal width, the opposite surfaces of alternate strip portions being provided with the lines of adhesive 34 and 39 while the surfaces of the adjacent strip portion are free of any adhesive.

After the web has been supplied with lines of adhesive 34, 39 and crease lines 44, 45, it is progressively folded longitudinally along the crease lines 44 and 45 (stations I and J) into a relatively narrow compacted ribbon-like formation. As shown particularly in Figs. 11 and 12, the longitudinal folding and gathering of the strip portions of the material is accomplished in a guideway having arranged therein a series of plow-like upper and lower folding blades or guide members 49 and 50, respectively. The folding blades 49 are supported on a base 51 and project downwardly therefrom. The blades 50 are arranged on a support 52 and project upwardly therefrom between the blades 49. The blades 49 and 50 extend longitudinally of the path of travel of the web of material and are spaced transversely of the web, at the end immediately adjacent the creasing members 42 and 43, in accordance with the lateral spaces between the upper and lower crease lines 44 and 45. The projecting edges of the blades 49, 50 engage the web along the fold lines 44 and 45 with adjacent blades engaging on alternate sides of the web. The blades 49 and 50 increase in depth and the space between the adjacent blades decreases progressively toward the end of the guideway which terminates short of a pair of packing rolls 53 so that the web of material is progressively folded longitudinally to bring the strip portions defined by the crease lines 44 and 45 into alternate face-to-face relation. The strip portions emerge from the guideway and thereafter pass between the packing rolls 53 in a compacted vertical or edgewise position with the folded edges of the strip portions forming the top and bottom surface of the compacted material.

The packing rolls 53 gather the strip portions of the material into a relatively narrow ribbon-like compacted formation. Top and bottom guide plates 54 and 55 may be provided to confine the top and bottom surfaces of the compacted material. Additional packing rolls of the same character as rolls 53 may be provided for holding the formation in compacted condition while it travels a path of sufficient length to permit the adhesive to dry or set and thereby connect the individual strip portions at longitudinally spaced points along the lines of adhesive 34, 39. A heating means or the like for setting the adhesive may be provided at this point in the operation, if desired. The use of a heat sensitive, pressure sensitive, or heat and pressure sensitive adhesive, or of any other suitable adhesive is contemplated.

When the machine is arranged for fabricating a core structure of a width requiring more than the single web 10 of the sheet material, the side webs 11 and 12 (Fig. 2) and any additional webs which are required may be perforated, supplied with transverse lines of adhesive, creased, and progressively folded longitudinally in the same manner as described with reference to web 10. The compacted material formed from the additional webs 11 and 12 may then be gathered or compacted by pairs of packing rolls 56 and 57, respectively, which are of the same character as packing rolls 53. This compacted material is thereafter gathered or brought together with the compacted material fabricated from the web 10 to form a composite ribbon-like formation of the desired width. Before bringing the compacted formations together, however, adhesive mechanism will be provided for applying transverse lines of adhesive to those edges of the compacted formations which will be brought into contacting relation when the composite formation is passed between the packing rolls 58 (station L), the latter being arranged in longitudinally spaced relation forwardly of the packing rolls 53. The transverse lines of adhesive may be conveniently applied by suitable adhesive applicator members 59 and 60 which will be supplied with adhesive in any conventional manner. All these lines of adhesive on the compacted formations, preferably will be arranged in proper longitudinally spaced relation, relative to the lines of adhesive 34 and 39 on the formation fabricated from web 10.

The composite compacted formation passes from the packing rolls 58 beneath a pair of spring-pressed guide shoes 61 and 62 which are arranged in longitudinally spaced relation on the rearward and forward sides, respectively, of a trimming or cutting roll 63 (station M). The trimming roll 63 is provided on its peripheral surface with knives or abrasive material for trimming or removing the top surface of the compacted formation. The bottom guide plate 55 may be conveniently extended slightly beyond the forward guide shoe 62 to provide a platen for cooperation with the trimming roll 63.

The bottom surface of the compacted formation is trimmed or cut by a bottom trimming roll 64 (station N) which is longitudinally spaced forwardly of the top trimming roll 63 between the spring pressed guide plates 65 and 66. A top guide plate or platen 67 is provided opposite the bottom trimming roll 64. The bottom trimming roll 64 is of the same character as the top trimming roll 63. The rolls 63 and 64 trim or cut the top and bottom faces of the compacted material sufficiently to remove the folded edges of the individual strip portions to thereby disconnect the strip portions at their top and bottom edges and leave them connected only at the longitudinally spaced points defined by the transverse lines of adhesive. The compacted and connected strips are at this point in condition to be expanded transversely into a honeycomb structure of predetermined width.

The expansion of the connected strip formation is begun as the formation passes between a pair of pull rollers 68 (station O) which are driven at a predetermined speed by conventional drive mechanism. The formation is thereafter subjected to a spreading or expanding mechanism which opens out the connected strips into the honeycomb structure and maintains the same in expanded condition while it is subjected to the rigidifying treatment.

The mechanism provided for expanding the connected strip formation laterally into the honeycomb structure comprises a pair of edge guide wheel members 69 (station P) which are located a short distance forwardly of the pull rollers 68 and which have their peripheral surfaces arranged in opposed relation on opposite sides of the path of movement of the connected strip formation. The wheels 69 are spaced laterally a distance which will be determined by their longitudinal position and the ultimate width of the honeycomb structure. The peripheral surface of each wheel 69 is approximately a width corresponding to the thickness of the honeycomb structure and is adapted to engage in guiding relation the outer side edge of the same as it is progressively expanded after leaving the rolls 68. The wheels 69 limit the outward movement of the outer edges of the expanding structure at a point intermediate the fully compacted condition adjacent the rolls 68 (station O) and the fully expanded condition (station Q).

The edge guide wheels 69 position the side edges of the expanding honeycomb structure for engagement by a series of needles or pins 70 which are mounted to travel in endless paths on opposite sides of the structure and to successively engage in the cells of the structure adjacent the outer edges of the same as the latter moves past the guide wheels 69 and engages with portions of the surfaces thereof.

Each needle 70 is mounted in a vertically extending generally rectangular frame 71. A compression spring 72 abuts the inside of the lower end of the frame 71 and a stop member 73 on the shaft of the needle tending to raise the needle relative to the frame 71. The upper end of the needle shaft is provided with a cam roll 74 which is controlled by a cam track 75 mounted on the guide 76 which provides an endless path for a predetermined number of the needles. A guideway 76 having a series of needles operating therein is provided on each side of the path of travel of the honeycomb structure, extending from a point adjacent guide wheel 69 to the end of the machine. Each needle carrying frame 71 is mounted on a link plate 77 which is provided with four rollers 78 operating in the guide track 76. The plates 77 are connected in the usual manner and constitute the links of an endless conveyor for the needles.

Each conveyor guideway 76 is positioned at the trailing end (Figs. 3 and 7) so that the needles 70 when projected downwardly of the frame 71 are spaced a sufficient distance from the periphery of the respective edge guide wheels 69 to accommodate the outer strip portion or portions forming the edge of the honeycomb structure. The cam track 75 is arranged so that when the needles 70 reach the proper position in their path of travel, adjacent the periphery of the wheel 69 the cam rollers 74 engage the end 79 (Figs. 7 and 13) of the cam track and the needles are projected downwardly to engage successively in the outer cell spaces of the honeycomb structure. The guideways 76 provide curved paths which move the needles carried by the respective guideways outwardly relative to the center of the machine to expand the honeycomb structure to the desired width. The path of travel of the needles is generally parallel to the center of the machine from the point where the honeycomb structure is fully expanded to the end of the machine, thus maintaining the honeycomb structure in controlled expanded condition throughout the remaining operations.

While the honeycomb structure is maintained in expanded condition by the pins 70 it is carried through an immersion tank 80 (station Q) where it is impregnated with a suitable rigidifying material. Preferably, a depth control roll 81 is provided for cooperation with the immersion tank 80 to insure complete immersion of the honeycomb structure. Any number of supporting rollers 82 may be provided for guiding and supporting the expanded structure. The rigidifying material which may be, for example, a heat settable resin, may also be applied, if preferred, by means of suitable spray mechanism.

After the honeycomb structure is impregnated with the rigidifying composition it is passed through a heating chamber 83 where the rigidifying material is set so that the honeycomb structure is made rigid or fixed in its expanded condition.

A pair of flying shears 84 are arranged on opposite sides of the honeycomb structure to sever the same into predetermined lengths after the rigidifying material has been cured in the heating or drying chamber 83. The flying shears preferably comprise revolving cutters 85 which are operated by springs 86 and fixed cams 87 in timed relation to the perforating or punching knives 23 (Figs. 1 and 5) at the other end of the machine so that the knives 85 cut through the material at the location of the perforations 24 and completely sever the continuously advancing structure into sections of predetermined length. The respective sections are then conveyed away in any convenient manner for incorporation in door panels or other structures.

The pins 70, controlled by the cam track 75, remain in engagement in the marginal cells of the honeycomb structure until after it is cut by the flying shears. The cam track 75 is provided at its end 88 (Fig. 8) with an upwardly directed or inclined track portion 89 which operates on the cam rollers 74 to raise the pins 70 out of engagement with the honeycomb structure. This insures positive withdrawal of the pins 70.

While the edge reinforcing strips 13 are shown applied to the outside edges of the web or webs at the beginning of the machine it is recognized that it may be desirable to apply the edge reinforcing strips to the outer edges of the material after it has been folded into the longitudinal strip portions and compacted. For example, the edge reinforcing strips may be conveniently applied at station K, it being necessary only to provide means for supporting a roll of the reinforcing strip material at that point and a suitable adhesive applying mechanism so that the strips may be joined to the compacted material as it is fed between the pairs of rolls 56 and 57.

A modification of a portion of the machine is illustrated in Figs. 15 to 24, which is adapted to be substituted for the mechanism shown between stations G and K in Figs. 2 and 6. In the modification the creasing and folding operations are performed on the traveling web of material in a somewhat different manner. Stations G', I', J' and K' on the modified form in Figs. 17 and 18 correspond to stations H, I, J and K in Figs. 2 and 6.

In the modified form of the machine, after the web of material 100 has been provided with the rows of longitudinally spaced transverse adhesive lines 101 and 102 on the top and bottom faces, respectively, it passes between a pair of cooperating crease applying members 103 and 104 (station G'). The crease applying members 103 and 104 (Fig. 19) apply the outermost crease lines 105 and 106 on the top and bottom surfaces of the web, respectively. The crease applying member 103 comprises an outer roll section 107 which is provided with a peripherally projecting creasing rule 108 and the crease applying member 104 comprises a platen forming roll section 109 for cooperating therewith to produce the longitudinal crease line 105 in the top surface of the web. A roll section 110 on the other end of crease applying member 104 is provided with a peripheral creasing rule 111 and member 103 is provided with a platen forming roll section 112 for cooperating therewith to produce the longitudinal crease line 106 on the bottom surface of the web. Extending between the roll sections 107 and 112 on the member 103 are a plurality of transversely spaced roll sections 113 which cooperate with a plurality of similar roll sections 114 on the crease applying member 104 to grip the web of material 100 in the transverse spaces between the rows of adhesive lines 101, 102. The roll sections 113 and 114 may be formed as an integral part of the crease applying members 103 and 104 with peripheral grooves provided for accommodating the rows of adhesive lines 101 and 102. The cooperating roll sections 113 and 114 firmly grip the web of material 100 between the creasing rules 108 and 111 and prevent buckling or lateral movement of the web 100 during the creasing operation, thereby insuring uniform spacing between the longitudinal crease lines 105 and 106. The crease lines 105 and 106 are adjacent the outer edges of the web 100 and the web is controlled between these crease lines so that buckling or transverse movement will occur only in the outer edge or strip formation between the crease lines 105 and 106 and the respective marginal edges of the web 100.

The next adjacent pair of longitudinally extending crease lines 115 and 116 are applied to the web by crease applying members 117 and 118 which are located forwardly of the crease applying members 103 and 104 and which apply the crease lines 115 and 116 in transversely spaced relation to the crease lines 105 and 106, respectively, but on opposite surfaces of the web. Crease lines 119 and 120 are applied by the longitudinally spaced crease applying members 121 and 122 and crease lines 123 and 124 are applied by cooperating crease applying members 125 and and 126 (Figs. 15 and 20). The crease applying member 126 includes roll section 127 having peripheral creasing rule 128 which cooperates with platen roll section 129 on the member 125 for applying crease line 123. Roll section 130 which is mounted on member 125 in axially spaced relation to the platen roll section 129 is provided with creasing rule 131 which cooperates with the platen roll section 132 on the member 126 for applying crease line 124. Cooperating web gripping roll sections 133 and 134 on the members 125 and 126, respectively, hold the central portion of the web 100 from buckling or shifting while the parallel crease lines 123 and 124 are applied on opposite surfaces of the web.

Crease lines 135 and 136 are applied to the web by longitudinally spaced cooperating crease applying members 137 and 138 and crease lines 139 and 140 are applied by similar longitudinally spaced cooperating crease applying members 141 and 142. The final or center pair of crease lines 143 and 144 are applied by crease applying members 145 and 146 between which the web passes. Crease line 143 is applied by roll section 147 which is mounted on member 145 and provided with a peripheral creasing rule 148 which cooperates with a platen roll section 149 mounted on member 146 while crease line 144 is applied by roll section 150 on member 146 provided with peripheral creasing rule 151 and cooperating with platen roll section 152 on member 145.

Platen forming roll sections 109 and 112 (Fig. 19), 129 and 132 (Fig. 20) and 149 and 152 (Fig. 21), are illustrated as formed of resilient material. However, these members may be formed of hard metal or any other suitable material and provided with peripheral creasing grooves aligned with the creasing rules on the roll sections of the cooperating creasing members. The intermediate web gripping roll sections 113 and 114 (Fig. 19) and 133 and 134 (Fig. 20) are also illustrated as formed of resilient material. These members may be formed of metal or any other suitable material.

With the crease applying members arranged as described the longitudinally extending crease lines are applied to the traveling web in pairs, beginning with the outermost or marginal pair of lines, 105 and 106, and progressing successively toward the lines 143 and 144 in the center of the web, in longitudinally spaced relation, the intermediate portion of the web between each pair of crease lines being controlled to prevent buckling and transverse movement during the forming of each successive pair of crease lines.

The web 100, with all the longitudinal crease lines applied thereto, next passes between a pair of guiding and controlling members 153 and 154 which are longitudinally spaced forwardly of the crease applying members 145 and 146. Member 153 is provided with a plurality of transversely spaced roll sections 155 and member 154 is provided with cooperating roll sections 156. The roll sections 155 and 156 are of a width somewhat narrower than the transverse spaces between rows of adhesive lines 101 and 102 so that they grip the web at this point and maintain it in a relatively flat condition thereby eliminating any interference with the uniform application of the crease lines or distortion of the paper while the crease lines are being applied. The roll sections 155 and 156 are illustrated as formed of resilient material but they may be formed of hard metal or other suitable material.

The web passes from the guiding and controlling members 153 and 154 into a folding mechanism comprising a series of cooperating folding blades or vanes which are shown in detail in Figs. 23 and 24 (stations I'' and J''). The upper folding blades 157 are supported from a plate 158 or the like and arranged in downwardly projecting transversely spaced relation across the width of the traveling web. The blades 157 extend downwardly in opposed relation to upwardly projecting transversely spaced cooperating folding blades 159 which are supported on a bottom plate 160 or the like. The blades 159 project upwardly intermediate the upper folding blades 157 and are in transverse spaced relation therewith. Blades 157 and 159 are arranged at the beginning of the folding operation so that their free edges engage the web along the longitudinal crease lines and approximately in the plane of the web. The lateral spacing between the blades 157 and 159 decreases progressively as the folding of the web strip portions proceeds.

The free edge of each blade also gradually projects an increasing distance between the opposite pair of blades with which it cooperates as the folding proceeds. The supporting members 158 and 160 for the folding blades 157 and 159 are in a horizontal plane at the beginning of the folding operation. They are transversely bowed or curved with increasing curvature as the folding operation progresses. This provides a path of travel for the center portion of the gathered material, which path will be longer than the path which would be provided for the center portion if the material were allowed to move straight across and not forced to move over the transversely curved support, thereby compensating for the difference in distance which the center and outer portions of the material would have to travel were the curved support not provided, particularly when a relatively wide web is used. The mechanism is arranged symmetrically approximately along the center line of the path of travel of the web and, as shown especially in Fig. 24, the folding blades 157 and 159 extend radially inwardly and outwardly of their supporting members 158 and 160, respectively, cooperating in their gradual approach toward each other to guide the web strip portions into alternate face-to-face folded relation. The material is thereafter delivered in almost completely folded relation between a pair of compacting rolls 161 and 162. (Station K'.) The latter rolls 161 and 162 correspond to rolls 53 in the form of the machine shown in Figs. 2 and 6, and subsequent operations on the folded and compacted material are performed by the same mechanism and in the same manner as illustrated in Figs. 2 to 4 and 6 to 8.

A further modification of the forward portion of the machine is illustrated in Figs. 25 to 30, inclusive wherein the stations indicated at A'' to L'', inclusive, correspond to stations A to L, inclusive, of the mechanism illustrated in Figs. 1, 2 and 5, 6. The principal features of this modification of the mechanism are the separation of the traveling web into individual strip portions by a slitting operation and the compacting of the individual strips in a somewhat different manner.

While this modification is designed to produce a core structure of a greater width than provided by a single web, for the purposes of illustration, only one web 200 has been shown. It will be understood that corresponding mechanism may be provided for additional webs which may be required, depending on the width of core structure described.

The web 200 is fed from a supply roll between a pair of control rollers 201 and thence to a pair of tension control rollers 202 which maintain the web 200 in taut condition while it is subjected to a punching operation by the punch roll 203 and the cooperating platen roll 204.

The punch roll 203 provides transversely of the web a plurality of slots 205 which are arranged in longitudinally staggered transversely spaced relation across the width of the web. The slots 205 are similar to the slots 26 provided by the punching roll 23 in the mechanism shown in Figs. 1 and 5 except for the longitudinally staggered relation thereof which is provided for a purpose that will be described subsequently.

A paper conditioning mechanism such as a heating plate 206 is provided intermediate the punch roll 203 and tension control rollers 202 for equalizing the moisture content of the web of material.

The web of material 200 passes from the control rollers 202 to an adhesive applying unit 207 which contains an adhesive applying roll 208 and a cooperating platen roll 209. The adhesive applying roll 208 is supplied with adhesive by the feed rolls 210 from a supply fountain 211. As illustrated in Figs. 25, 27 and 29, the adhesive applying roll 208 is provided on its peripheral surface with a series of projections for applying to the bottom surface of the web 200 longitudinal rows of spaced, transversely extending lines of adhesive 212, each of the lines being somewhat less in length than the desired depth of the ultimate core structure. The relatively short transversely extending adhesive lines 212 which constitute each longitudinally extending row are located so that they are staggered relative to the lines in the adjacent rows. The longitudinal rows of the adhesive lines are separated transversely by spaces 213 which accommodate the slitting knives or members 214 (Figs. 26, 28 and 30) which divide the web into individual ribbon-like strip portions 215.

The disk-like knives 214 are mounted in axially spaced relation on a bottom slitting member 216. A series of spaced guide roll sections 217 are mounted on a cooperating top slitting member 218, each pair of roll sections 217 being spaced apart a sufficient distance to accommodate a knife 214 which operates to slit the web. By means of this mechanism the web is slit into individual ribbons which are of uniform width and each of which is provided on its bottom surface with a row of longitudinally spaced transversely extending adhesive lines 212, except for the marginal ribbon 219 formed on the far side of the machine (as viewed in Fig. 26) which is free of the adhesive lines.

After the web of material has been divided into the individual ribbons or strip portions 215, the latter are each progressively turned through an angle of 90 degrees and then passed over individual guide rollers 220 which are mounted on vertical shafts and arranged forwardly of the slitting members 216, 218 in spaced apart relation transversely of the machine. The individual ribbons are turned so that their plain surfaces engage the guide rollers 220 and so that each surface which carries a row of adhesive lines 212 faces toward the plain surface of the adjacent ribbon. The guide rollers 220 are individually adjustable so that they can be arranged to vary somewhat the path of travel of the individual strip portions. The strip portions 215 are gathered together in compacted edgewise, face-to-face relation by a pair of packing rollers 221 (station K'').

The individual adhesive lines 212 in each longitudinally extending row are in staggered spaced relation relative to the lines in the adjacent row so that when they arrive at the packing rollers 221 the adhesive lines on adjacent strip portions 215 will be intermediate of each other. Due to the differences in individual ribbon lengths between guide rollers 220 and the packing rollers 221 it is necessary to stagger the adhesive lines in alternate rows by an amount equal to their differences in ribbon lengths in order to have them align transversely when the ribbons are gathered at the packing rollers 221. For the same reason the slots 205 are also longitudinally staggered as previously described.

One or more similarly fabricated compacted ribbon formations may be joined at the packing rollers 221 (station K″) to the formation fabricated from web 200. In Fig. 26 one additional formation is indicated which has been fabricated in the same manner and compacted by the packing rollers 222 which correspond to packing rollers 221. The individual compacted ribbon formations are joined by a pair of packing rollers 223 (station L″). A row of longitudinally spaced transversely extending adhesive lines of the same character as lines 212 is applied by an adhesive applicator indicated at 224 which may be similar to the applicator mechanism 208 to 211.

In order to provide edge reinforcement for the composite ribbon formation, edge reinforcing strips 225 and 226 are joined to the outer edges of the ribbon formations, as indicated. Each strip 225 is supplied on its inner face with adhesive by an applicator indicated at 227 and fed into engagement with the outer edge of the formation at the packing rollers 221. The adhesive applicator is supplied with adhesive from a supply fountain and feed means indicated at 228 and 229. In a similar manner edge reinforcing strip 226 is supplied on its inner face with adhesive by the applicator 230 and fed into engagement with the outer edge of the composite formation at the packing rollers 223. The adhesive applicator is supplied with adhesive from a supply fountain and feed means indicated at 231 and 232.

After the ribbon formation is compacted by rollers 223 (station L″) it is acted upon by the same mechanism as disclosed in Figs. 2, 3, 4, 6, 7 and 8, following the corresponding packing rollers 58 (station L), except that the top and bottom surface trimming devices 63 and 64 may be omitted since the strip formations are already separated at their edges by the slitting operation.

In Fig. 31 there is illustrated a method of providing reinforced edges on the core structure which may be substituted for the application of the separate edge reinforcing strips 13 in Figs. 1 and 2. In this method the marginal strip portions 300, 301, 302 and 303 are formed somewhat narrower than the intermediate strip portions 304 so that when the material is folded longitudinally the folded edges of the intermediate strip portions 304 which form the top and bottom surfaces of the compacted ribbon formation will be trimmed by members 63 and 64 (Figs. 6 and 7) and the intermediate strip portions 304 will be disconnected at their edges while the folded edges of the marginal strip portions 300, 301, 302 and 303 which do not extend to the cutting plane of the trimming members 63 and 64 will be left intact and the marginal strip portions 300, 301, 302 and 303 will remain connected at their edges by the fold portions as well as being connected by the transverse adhesive lines, thereby forming an edge wall of multiple thickness.

In the illustrated embodiments of the invention which have been presented herein specific materials and details of construction have been referred to by way of exemplification. It will be understood that other materials and other details of construction may be resorted to within the spirit of the invention.

We claim:

1. A method of producing a cellular structure from a web of paper or other flexible sheet material which consists in moving the web in the direction of its length, scoring the web along parallel lines to divide the web into a large number of relatively narrow strip portions extending longitudinally of the web, progressively folding the web along the score lines to bring said strip portions into face-to-face relation, connecting adjoining faces of said strip portions at longitudinally spaced points with the points of connection staggered on opposite faces of each of said strip portions, disconnecting said strip portions along their edges, progressively separating said face connected strip portions into a cellular structure of the desired width, applying a rigidifying material to the cellular structure and curing the same while maintaining the cellular structure in its expanded condition.

2. A method of producing a cellular structure from a web of paper or other flexible sheet material which consists in moving the web in the direction of the length, providing score lines on the web to divide the same into a large number of relatively narrow strip portions extending longitudinally of the web, the marginal score lines being applied first and the intermediate score lines being applied successively in spaced relation toward the center of the web and longitudinally along the web, progressively folding the web along the score lines to bring said strip portions into face-to-face relation, connecting adjoining faces of said strip portions at longitudinally spaced points with the points of connection staggered on opposite faces of each of said strip portions, disconnecting said strip portions along the fold lines, progressively separating said face connected strip portions into a cellular structure of the desired width, applying a rigidifying material to the cellular structure and curing the same while maintaining the cellular structure in its expanded condition.

3. A method of producing a cellular structure from a web of paper or other flexible sheet material which consists in moving the web in the direction of its length, providing score lines on the web to define a plurality of relatively narrow strip portions extending longitudinally of the web, said score lines being applied in successive staggered relation inwardly and longitudinally of the web, progressively folding the web along the score lines to bring said strip portions on edge and into face-to-face relation, connecting adjoining faces of said strip portions at longitudinally spaced points with the points of connection staggered on opposite faces of each of said strip portions, disconnecting said strip portions along the fold lines, progressively expanding said face connected strip portions into a cellular structure of the desired width, applying a rigidifying material to the cellular structure and curing the same while maintaining the cellular structure in its expanded condition.

4. A method of producing a cellular structure from a web of paper or other flexible sheet material, which consists in moving the web in the direction of its length, scoring the web along parallel lines extending lengthwise thereof to divide the web into a large number of relatively narrow longitudinally extending strip portions, progressively folding the web along the score lines to bring said strip portions on edge and into face-to-face relation, connecting adjoining faces of said strip portions along longitudinally spaced transverse lines with the lines of connection staggered on opposite faces of each of said strip portions, removing the folded top and bottom edges of said strip portions, progressively separating said face connected strip portions into a cellular structure of the desired width, applying a rigidifying material to the cellular structure and curing the same while maintaining the cellular structure in its expanded condition.

5. A method of producing a cellular structure from a web of paper or other flexible sheet material which consists in moving the web in the direction of its length, providing score lines on the web to define a plurality of relatively narrow longitudinally extending strip portions, said score lines being applied in successive staggered relation inwardly and longitudinally of the web, progressively folding the web along the score lines to bring said strip portions on edge and into face-to-face relation, connecting adjoining faces of said strip portions along longitudinally spaced transverse lines with the lines of connection staggered on opposite faces of each of said strip portions, removing the folded top and bottom edges of said strip portions, progressively separating said face connected strip portions into a cellular structure of the desired width, applying a rigidifying material to the cellular structure and curing the same while maintaining the cellular structure in its expanded condition.

6. A method of producing a cellular structure from a continuously moving web of paper or other flexible sheet material which consists in providing score lines on the webs to divide the same into a large number of relatively narrow longitudinally extending strip portions, the score lines adjacent each margin being spaced a predetermined distance which distance is approximately the depth of the desired core structure and the intermediate score lines being spaced apart a distance somewhat greater than the depth of the desired core structure, progressively folding the web along the score lines to bring said strip portions into edgewise face-to-face relation with the folded edges of the intermediate strip portions extending above and below the folded edges of the marginal strip portions, connecting adjoining faces of said strip portions at longitudinally spaced points with the points of connection staggered on opposite faces of each of said strip portions, disconnecting the intermediate strip portions at the edges by removing the folded edge portions thereof and allowing the marginal strip portions to remain connected at the edges to form reinforced multi-ply edge members, progressively separating said face connected intermediate strip portions into a cellular structure of the desired width by engaging the multi-ply edge members and moving in an outward and then parallel direction, applying a rigidifying material to the cellular structure and curing the same while maintaining the cellular structure in its expanded condition.

7. A method comprising the steps recited in claim 4 and the additional step of applying a reinforcing edge strip in connected relation along the outer margin of the web, the width of said reinforcing strip being approximately the same as the width of the longitudinally extending strips into which the web is divided.

8. A method as recited in claim 4 and including applying strips of edge reinforcing material along the margins of the web in superimposed relation to the longitudinally extending strip portions adjacent said margins whereby when the cellular structure is completed it will be provided with multi-ply edge strip members along the marginal edges thereof.

9. A method as recited in claim 4 and including applying strips of edge reinforcing material along the outer face of the outer one of the folded and connected strips to provide a multi-ply edge formation on the cellular structure.

10. A method as recited in claim 4 and including the step of connecting strips of edge reinforcing material to the outer faces of the marginal ones of the connected strips to provide reinforced edges for the formed honeycomb structure.

11. A method as recited in claim 4 and including successively punching lines of spaced slots in the web which slots extend transversely of the web and which are so located relative to the strips that the individual slots in each line extend vertically within the top and bottom edges of the strips and in transverse registry when the cellular structure is formed and dividing the completed honeycomb structure into predetermined lengths by cutting along each successive line of said slots.

12. A method as recited in claim 4 and including providing successive transversely extending lines of spaced slots in the web, each slot being of less length than the width of the strips into which the web is subsequently divided and the slots in each line being separated transversely by spaces whereby when the cellular structure is formed the individual slots extend vertically within and terminate short of the top and bottom edges of the strips while the slots in each successive line are in substantial transverse registry, and dividing the rigid cellular structure into predetermined lengths by cutting along each successive line of said slots.

13. A method as recited in claim 12 including providing successive lines of slots in the web with the slots in each line in alignment transversely of the web.

14. A machine for producing a cellular core structure from a web of paper-like flexible sheet material which comprises in combination a supporting structure, means for continuously feeding a web of the material along a predetermined path, means for providing score lines on the web to define a plurality of relatively narrow longitudinally extending strip portions, said means being arranged to apply said score lines in successive staggered relation inwardly and longitudinally of the web, means for progressively folding the web along the score lines to bring said strip portions on edge and into face-to-face relation and to form thereby a relatively narrow ribbon formation, means for connecting adjoining faces of said strip portions at longitudinally spaced points with the points of connection staggered on opposite faces of each of said strip portions, means on opposite sides of the path of travel of said ribbon formation for disconnecting said strip portions along the fold lines, means spaced laterally relative to the path of travel of said ribbon formation for progressively separating said face connected strip portions and expanding said ribbon formation laterally into a cellular structure of the desired width, and means for applying a rigidifying material to the cellular structure and curing the same while maintaining the cellular structure in its expanded condition, all of said means being arranged on said supporting structure along said path of movement and being operated in timed relation relative to the movement of the material.

15. A machine as recited in claim 14 wherein the means for providing the longitudinal score lines comprises longitudinally spaced pairs of rotatable scoring members having scoring rules on each successive pair arranged in staggered relation inwardly towards the center of the path of travel of the web.

16. A machine as recited in claim 14 wherein the means for progressively folding the web along the longitudinal score lines comprises laterally spaced longitudinally extending plow members arranged on opposite sides of the webs with an edge of each plow member engaging the web along a longitudinal score line and with said web engaging edge projecting a gradually increasing distance between the edges of the opposed plow members.

17. A machine as recited in claim 16 wherein the plow members on opposite sides of the web are supported with their web engaging edges approximately in the plane of the web at the beginning of the progressive folding operation and side edges being arranged in an arc transversely of the path of travel of the web at the end of the folding operation.

18. A machine for producing from a web of relatively thin flexible material a rigid honeycomb core structure in continuous ribbon-like form which includes in combination a supporting structure, means for continuously feeding the web of material in a predetermined path, means for punching longitudinally spaced transversely extending rows of relatively short slots in the material each of said slots extending in a transverse direction, means for applying transversely spaced adhesive lines in alternately spaced relation longitudinally on opposite sides of the web, means for applying longitudinal crease lines in transversely spaced relation on opposite faces of the web to divide the web into longitudinally extending strip portions, means for folding the strip portions into alternate face-to-face relation, means for compacting the folded strip portions into a relatively narrow solid compacted ribbon-like formation, means for trimming opposite faces of the compacted strip formation to remove the edges of the strip portions, means for laterally spreading the connected strip portions to open up the ribbon-like formation into a honeycomb structure, means for applying a rigidifying material to the honeycomb structure while it is in expanded condition and for setting the rigidifying material, and means extending transversely of the path of movement of the structure for cutting the same into sections of predetermined length along a transversely extending row of slots, all of said means being arranged on supporting structure along the path of movement of the material and all of said means being connected to operate on said material in cooperative timed relation to the movement of the same.

19. A machine for producing from a web of relatively thin flexible material a rigid honeycomb core structure in continuous ribbon-like form which includes in combination a supporting structure, means for continuously feeding the web of material in a predetermined path, means for punching longitudinally spaced rows of transversely spaced slots in the material, means for applying longitudinally extending rows of transversely spaced relatively short lines of adhesive to the web, the lines in each row being applied in alternately spaced relation longitudinally on opposite sides of the web, means for applying parallel longitudinal crease lines in transversely spaced relation on opposite faces of the web to divide the web into longitudinally extending strip portions, said means applying said longitudinal crease lines between the rows of adhesive lines, means for folding the strip portions into alternate face-to-face relation, means for compacting the folded strip portions into a relatively narrow solid formation with the faces of adjacent strips connected at alternately spaced points along the lines of adhesive, means for trimming opposite faces of the connected strip formation to remove the edges of the strip portions, means for laterally spreading the connected strip portions into a honeycomb formation, means for applying a rigidifying material to the honeycomb formation while it is in expanded condition and for setting the rigidifying material, and means for cutting the rigid honeycomb formation into sections, said cutting means being arranged to cut along the lines of the punched slots, all of said means being arranged on said supporting structure along the path of movement of the material and all of said means being connected to operate on said material in cooperative timed relation to the movement of the same.

20. A machine for producing a honeycomb core structure from a continuously moving web of flexible paper-like material comprising a supporting structure, means for continuously feeding the web of material along a predetermined path, means for applying laterally spaced longitudinally extending rows of adhesive lines on both sides of the web with the lines in each longitudinal row being in alternate spaced relation on opposite sides of the web and being of a length somewhat less than the desired thickness of the honeycomb structure, means for applying crease lines on opposite faces of the web between the longitudinally extending rows of adhesive lines to divide the web into a plurality of strip portions, means for progressively folding the web on the crease lines to bring the strip portions into alternate face-to-face compacted relation, means for retaining the folded strip portions in compacted relation while the adhesive sets to thereby connect the faces of the strip portions, means for removing the folds of the strip portions to disconnect the strips at their edges, means for engaging the outer strips to progressively move them in opposite directions and thereby expand the connected strips into a honeycomb formation, means for maintaining the honeycomb formation in expanded condition for a predetermined distance, means for applying a rigidifying material to the honeycomb formation and for setting the rigidifying material while it is in expanded condition, all of said means being arranged on said supporting structure along the path of movement of the material and all of said means being connected to operate on said material in cooperative timed relation to the movement of the same.

21. A machine as recited in claim 20 wherein the means for engaging the outer strips to expand the connected strips into a honeycomb formation comprises side guide members spaced along opposite side edges of the honeycomb formation for limiting the outward movement of the outer strips at an intermediate point in the expanding operation, and a plurality of fingers arranged on opposite sides of said formation for engaging the formation adjacent said outer strips, said fingers being mounted for movement in an endless path which extends forwardly and outwardly of the side guide members to thereby expand the formation to the desired width.

22. In a machine of the character described, mechanism for continuously expanding into a ribbon-like honeycomb structure a solidly compacted formation which is characterized by a plurality of individual strips of material arranged in edgewise face-to-face relation and connected at spaced points, which mechanism comprises a pair of endless conveyors arranged to travel on opposite sides of the path of movement of the material, the trailing ends of said conveyors being separated a distance which is less than the fully expanded width of the honeycomb structure and the forward portions of said conveyors being separated a distance which is approximately equal to the fully expanded width of the honeycomb structure, and means on said conveyors for engaging marginal portions of the honeycomb structure at points adjacent the trailing ends of said conveyors whereby to move said marginal portions outwardly and to fully expand the honeycomb structure to its desired width.

23. In a machine of the character described, mechanism for continuously expanding into a ribbon-like honeycomb structure a solidly compacted formation consisting of a plurality of strips of material arranged in edgewise face-to-face relation and connected at spaced points, which mechanism comprises a pair of endless conveyors arranged to travel on opposite sides of the path of movement of the material, the trailing ends of said conveyors being separated a distance which is less than the fully expanded width of the honeycomb structure and the forward portions of said conveyors being separated a distance which is approximately equal to the fully expanded width of the honeycomb structure, movable pins on said conveyors, and cam means cooperating with said movable pins to project the ends of said pins into marginal cell spaces at points adjacent the trailing ends of said conveyors whereby to move said marginal portions outwardly and to fully expand the honeycomb structure.

24. In a machine of the character described, mechanism for continuously expanding into a ribbon-like core structure a continuous solidly compacted formation of strips of material which are characterized by being free along their edges and connected at spaced points in face-to-face relationship, said mechanism comprising a pair of endless conveyors arranged to travel on opposite sides of the path of movement of the material, the trailing ends of said conveyors being separated a distance which is less than the fully expanded width of the core structure and the forward portions of said conveyors being separated a distance which is approximately equal to the fully expanded width of the core structure, means on said conveyors for engaging marginal portions of the core structure at points adjacent the trailing ends of said conveyors, and guide means adjacent the trailing ends of said conveyors for engaging the side edges of said core structure to guide the same into position for engagement thereof by said means on said conveyors whereby to move said marginal portions outwardly and to fully expand the core structure to its desired width.

25. In the manufacture of an open cellular structure, the method of making an initially compact core of closed cellular construction for subsequent expansion to produce the open cellular structure, which consists in moving a web of thin sheet material in the direction of its length, progressively forming the web during its movement into a plurality of relatively narrow longitudinally extending strips, which strips are many times wider than they are thick, progressively turning the strips on edge and bring the same together in face-to-face relation, and progressively securing the strips together at longitudinally spaced points only, with the points of attachment of each strip to the strips on the opposite sides thereof staggered to permit of said subsequent expansion, said strip forming operation comprising the step of reversely folding the web along the edges of the strips which edges at the lines of fold are subsequently trimmed off to separate the strips.

26. In the manufacture of an open cellular structure, the method of making an initially compact core of closed cellular construction for subsequent expansion to produce the open cellular structure, which consists in moving a web of thin sheet material in the direction of its length, progressively forming the web during its movement into a plurality of relatively narrow longitudinally extending strips, which strips are many times wider than they are thick, progressively turning the strips on edge and bringing the same together in face-to-face relation, and progressively securing the strips together at longitudinally spaced points only, with the points of attachment of each strip to the strips on the opposite sides thereof staggered to permit of said subsequent expansion, said strip securing operation comprising the step of employing a cementing material, which cementing material is applied to the web before the strip forming operation.

GEORGE I. GOODWIN.
HOWARD H. KLEE.

References Cited in the file of this patent

UNITED STATES PATENTS

| Number | Name | Date |
| --- | --- | --- |
| 1,263,987 | Wyman | Apr. 23, 1918 |
| 1,389,294 | Dean | Aug. 30, 1921 |
| 1,924,472 | Thomson | Aug. 29, 1933 |
| 1,929,137 | Cassegrain | Oct. 3, 1933 |
| 1,959,409 | Campbell | May 22, 1934 |
| 2,268,625 | Sigoda | Jan. 6, 1942 |
| 2,275,336 | Attwood | Mar. 3, 1942 |
| 2,284,254 | Batcheller | May 26, 1942 |
| 2,366,130 | Slavek | Dec. 26, 1944 |
| 2,368,445 | Brandt | Jan. 30, 1945 |
| 2,369,006 | Banks | Feb. 6, 1945 |
| 2,373,500 | Pearce | Apr. 10, 1945 |
| 2,420,525 | Deloye | May 13, 1947 |
| 2,428,979 | May | Oct. 14, 1947 |
| 2,553,054 | Lincoln et al. | May 15, 1951 |